United States Patent [19]

Giles et al.

[11] Patent Number: 5,702,015
[45] Date of Patent: Dec. 30, 1997

[54] CLOSURE SEAL FOR CONTAINER

[75] Inventors: Joseph M. Giles, Secor; William Bennington, Normal; Steven Brucker, Gibson City, all of Ill.

[73] Assignee: Selig Sealing Products, Inc., Forrest, Ill.

[21] Appl. No.: 646,946

[22] Filed: May 8, 1996

Related U.S. Application Data

[63] Continuation of Ser. No. 237,838, May 4, 1994, abandoned.

[51] Int. Cl.$^6$ ........................................... B65D 43/02
[52] U.S. Cl. ........................... 215/232; 215/347; 215/349
[58] Field of Search ........................... 215/232, 347, 215/349

[56] References Cited

U.S. PATENT DOCUMENTS

| | | |
|---|---|---|
| 3,317,068 | 5/1967 | Betner . |
| 3,508,754 | 4/1970 | Shorin . |
| 4,269,321 | 5/1981 | Ichinose et al. . |
| 4,448,345 | 5/1984 | Helms . |
| 4,480,760 | 11/1984 | Schonberger . |
| 4,501,371 | 2/1985 | Smalley . |
| 4,576,297 | 3/1986 | Larson . |
| 4,636,273 | 1/1987 | Wolfersperger . |
| 4,684,554 | 8/1987 | Ou-Yang . |
| 4,754,890 | 7/1988 | Ullman et al. . |
| 4,767,016 | 8/1988 | Cook, Jr. et al. . |
| 4,815,618 | 3/1989 | Gach . |
| 4,839,123 | 6/1989 | Duncan . |
| 4,863,061 | 9/1989 | Moore . |
| 4,934,544 | 6/1990 | Han et al. ................. 215/232 |
| 4,960,216 | 10/1990 | Giles et al. ............... 215/232 |
| 4,961,986 | 10/1990 | Galda et al. . |
| 5,004,111 | 4/1991 | McCarthy ................. 215/232 |
| 5,118,377 | 6/1992 | Parkinson et al. . |
| 5,197,618 | 3/1993 | Goth ......................... 215/232 |
| 5,265,745 | 11/1993 | Pereyra et al. .............. 215/232 |
| 5,308,690 | 5/1994 | Butcher, Jr. . |

FOREIGN PATENT DOCUMENTS

| | | | |
|---|---|---|---|
| 557780 | 5/1930 | Germany | ................. 215/347 |
| 284667 | 4/1931 | Italy . | |
| 89/02401 | 3/1989 | WIPO . | |
| 9009934 | 9/1990 | WIPO | ................. 215/232 |

*Primary Examiner*—Stephen Cronin
*Attorney, Agent, or Firm*—Hill, Steadman & Simpson

[57] ABSTRACT

A seal for a container is provided with a method of manufacturing the same. The seal has a unitary pull-tab portion having with a pull-tab formed therein. A layer of polyester film preferably is secured to the unitary member over the pull-tab. A foil seal portion preferably is secured to the pull-tab portion and constructed for securing around the opening of the container. The pull-tab portion preferably is formed of a first layer of a plastic material fused to a second layer of the plastic material by extruding the one onto the other with a release layer therebetween such that an unfused portion of the first layer forms the pull-tab.

11 Claims, 1 Drawing Sheet

U.S. Patent
Dec. 30, 1997
5,702,015
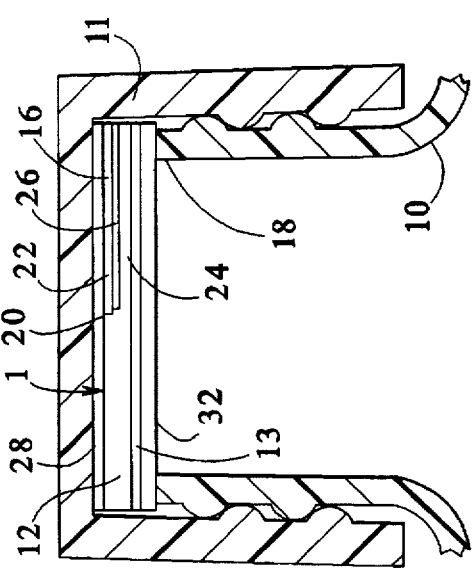
FIG. 1
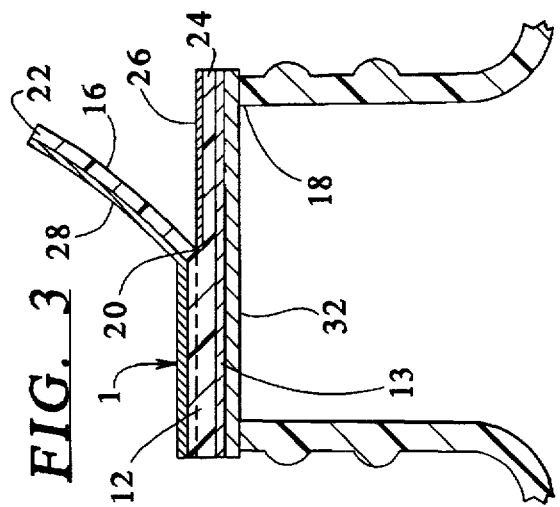
FIG. 3
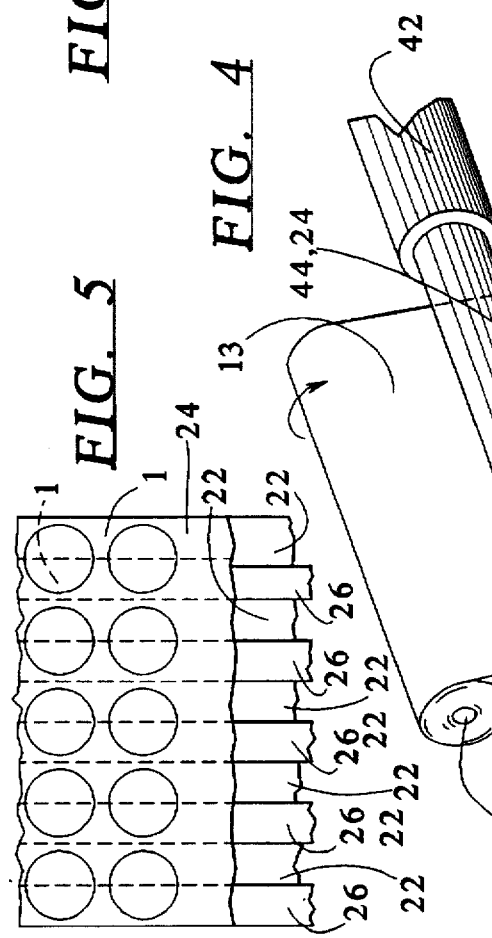
FIG. 5
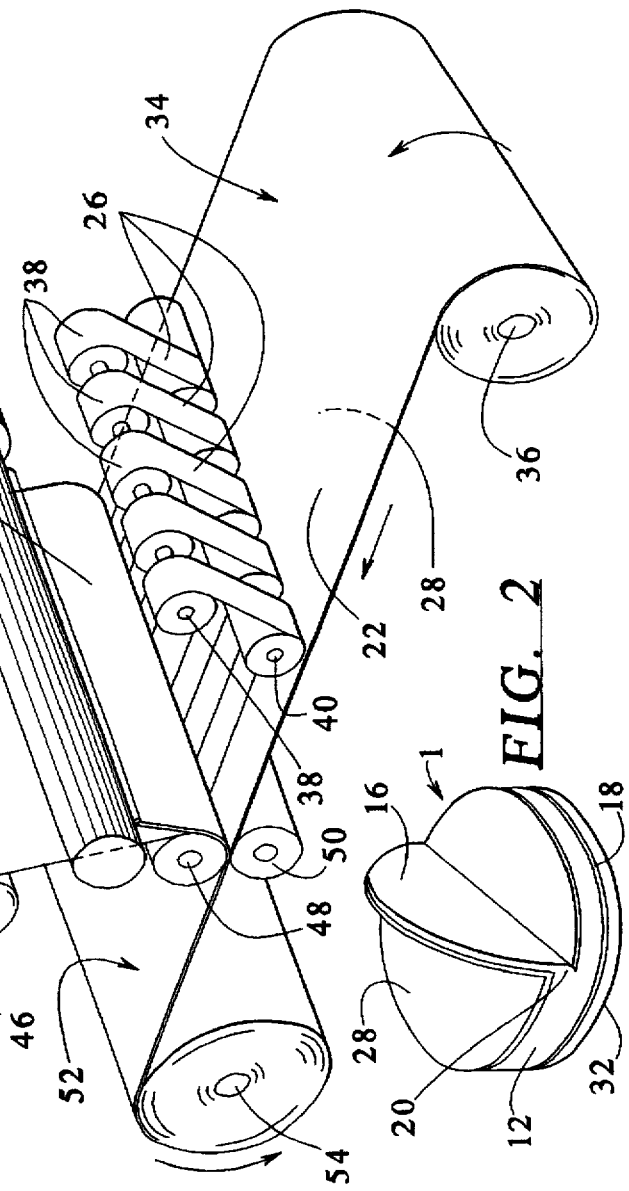
FIG. 4
FIG. 2

5,702,015

CLOSURE SEAL FOR CONTAINER

This is a continuation of application Ser. No. 08/237,838, filed May 4, 1994 now abandoned.

BACKGROUND OF THE INVENTION

The present invention relates generally to tamper proof seals for containers such as bottles and the like. Specifically, the invention relates to an inner seal having a pull-tab formed thereon.

In the packaging of certain products, such as bottled products, it is desirable to provide a seal that retains the freshness of the contents and which indicates whether the seal has been tampered with. Moreover, it is desirable that such a seal be easily removable by the ultimate user of the product.

For example, U.S. Pat. No. 4,501,371, the disclosure of which is incorporated herein by reference, discloses a tamper indicating, non-resealable closure or seal for a container. The closure includes a foil sheet having a layer of thermoplastic material on each surface thereof. The foil sheet is thermally bonded to a container opening. A liner ring overlies the foil sheet and is thermally bonded to the thermoplastic material of the foil.

Another type of seal is disclosed in an advertisement placed by Stanpac, Inc., a Canadian Corporation located in Smithville, Ontario. The Stanpac advertisement, appearing at page 70 of the March, 1988 issue of *Packaging Digest*, discloses a peel-off tamper indicating seal for a container having multiple layers and a tab formed thereon. This seal appears to be the same as that disclosed in U.S. Pat. No. 4,961,986, the disclosure of which is incorporated herein by reference.

The seal includes a layer of 0.0015 inches thick aluminum foil with a coating of heat activated adhesive on its bottom surface. A portion of a 0.005 inches thick two-ply sheet formed of polyester laminated paper is glued to the top surface of the aluminum foil. The seal is shaped like a disc with the unattached half of the polyester-laminated-to-paper sheet forming a pull-tab used to peel of the seal from a container.

The disclosed Stanpac stamped seal, however, has several drawbacks. The paper layer employed in the tab is susceptible to curling in the presence of moisture. Additionally, because the tab flaps freely, it can become misaligned during capping of a container and then can get in the way of the cap.

U.S. Pat. No. 5,004,111, the disclosure of which is incorporated herein by reference, also discloses a closure for a container. The closure has a pull-tab formed of a layer, a portion of which is secured by an adhesive to a foil layer.

U.S. Pat. No. 4,960,216, the disclosure of which is incorporated herein by reference, discloses yet another seal construction.

Therefore, a need exists for an improved container seal, particularly having a pull-tab and which indicates tampering.

SUMMARY OF THE INVENTION

The present invention provides a new closure. More specifically, the present invention provides a closure seal with a pull-tab and a method of making the same, particularly for sealing a container such as bottle.

To this end, in an embodiment, a tamper indicating closure for a container is provided. The closure has a seal portion and a pull-tab portion. The seal portion has an upper surface and a lower surface. The lower surface is securable around an opening of the container. The pull-tab portion (preferably made of polyethylene) is secured across the upper surface of the seal portion and has a pull-tab formed therein.

In an embodiment, the closure also has a layer of polyester film bond over an upper surface of the pull-tab.

In an embodiment, the seal portion is a foil layer.

In an embodiment, the closure further has a layer of release material which separates a portion the pull-tab from the remainder of the pull-tab portion.

In an embodiment, the pull-tab portion is a unitary member formed of a first layer of a plastic material and a second layer of the plastic material at least portions of which are fused together.

In an embodiment, the second layer is extruded onto a sheet of the first layer.

The invention further provides a method for manufacturing a closure seal for a container. Preferably comprising the method are the steps of: providing a sheet of a first layer of plastic material (preferably polyethylene); positioning a release layer onto a portion of the first layer so that there is a covered surface portion and an exposed surface portion of the first layer; and extruding a second layer of the plastic material onto the exposed surface portion and the release layer so that the second layer fuses to the exposed surface but does not fuse to the release layer, the unfused portion of the first or second layer defining a pull-tab.

In an embodiment, the a circular disc is cut from the layers so that the disc partially overlaps the release layer.

In an embodiment, a foil layer is secured to the second layer.

In an embodiment, an adhesive layer is added to the foil layer.

In an embodiment, the adhesive layer is heat activated.

In an embodiment, heat is applied to the adhesive layer.

In an embodiment, the first layer of plastic material is backed onto a sheet of polyester film.

In an embodiment, the polyester film, the first layer, the release layer, and the second layer are pressed between two rollers while the second layer is partially melted.

In an embodiment, at least one of the rollers is heated.

In an embodiment, multiple strips of the release layer are positioned on the first layer so that the strips are placed apart from one another.

It is, therefore, an advantage of the present invention to provide a method and an apparatus for sealing a container.

A further advantage of the present invention is to provide a closure seal which can be efficiently manufactured.

Another advantage of the present invention is to provide a closure seal having a unitary pull-tab portion with a pull-tab unitarily formed therein.

Yet another advantage of the present invention is to provide a closure seal having a pull-tab which resists breaking.

Additional features and advantages of the present invention are described in, and will be apparent from, the detailed description of the presently preferred embodiments and from the drawings.

BRIEF DESCRIPTION OF THE DRAWINGS

FIG. 1 is a cross-sectional view of a container top including a closure seal formed in accordance with the principals of the present invention.

FIG. 2 is a perspective view of a closure seal formed in accordance with the principals of the present invention.

FIG. 3 is a fragmentary cross-sectional side view of a container including a seal formed in accordance with the principals of the present invention.

FIG. 4 illustrates a perspective view of manufacturing of a seal in accordance with the principals of the present invention.

FIG. 5 is a top view of a composite sheet of layered materials manufactured in accordance with the method of the present invention, having sections broken away to show separate layers and showing circular portions to be cut from the composite sheet, forming closure seals of the present invention.

DETAILED DESCRIPTION OF THE PRESENTLY PREFERRED EMBODIMENTS

In accordance with the invention, a closure seal 1, as illustrated in FIGS. 1–3, is provided for sealing a container 10, such as a bottle. As shown, the closure seal 1 can be an inner seal which is provided under a cap 11 of the container 10.

The closure seal 1 includes a pull-tab portion 12 and a seal portion 13. The pull-tab portion 12 is a unitary member in which a pull-tab 16 is unitarily formed. The pull-tab portion 12 is secured entirely across an upper surface of the seal portion 13. A lower surface of the seal portion 13 is sealable around an opening 18 of the container 10.

The pull-tab 16 is formed in the pull-tab portion 12 so that the pull-tab 16 can be gripped to remove the closure seal 1, including the seal portion 13, from the opening 18 of the container 10.

The pull-tab 16 extends from the remainder of the pull-tab portion 12 at a hinging edge 20. The pull-tab-portion 12 preferably is made of a resilient and flexible plastic. Therefore, the hinging edge 20 allows the pull-tab 16 to be deflected upward, as illustrated in FIGS. 2 and 3, so that a user can grip the pull-tab 16. The unitary construction gives the closure seal 1 strength and resistance to failure that could arise from pulling on the pull-tab 16. Furthermore, the construction of the present invention avoids the use of adhesives or superfluous components to connect a pull-tab, as occurs, for example, in U.S. Pat. Nos. 4,961,986 and 5,004,111.

The pull-tab portion 12, as illustrated in FIGS. 1–3, is preferably constructed of a first layer 22 and a second layer 24 made of the same material. The two layers 22 and 24 are fused, or melted together where indicated by the dotted line in FIG. 3. A portion of the first layer 22 forms the pull-tab 16. The fused portions of the first layer 22 and second layer 24 and unfused portion of the second layer 24 form the remainder of the pull-tab portion 12.

The first layer 22 and second layer 24 preferably are partially separated at the pull-tab 16 by a release layer 26 interposed therebetween. The separation is necessary to define the pull-tab 16. The release layer 26 is one material that resists bonding to the plastic material of the pull-tab portion 12. Therefore, the release layer 26 can keep the pull-tab 16 in the first layer 22 from bonding to the remainder of the second layer 24 during an operation of fusing the first layer 22 and second layer 24 together. As a result, the pull-tab 16 is formed by a separation in the pull-tab portion 12, wherein the separation is generally parallel to the seal portion.

As illustrated, the closure seal 1 can include several layers. A backing layer 28 can be formed on top of the unitary pull-tab portion 12. The backing layer 28 is preferably formed of polyester, but can be made of some other resilient material that can be provided in a sheet. The backing layer 28 adds strength to the pull-tab 16.

A heat activated adhesive layer 32 can be used to adhere the seal 1 to the opening 18 of the container 10. The heat activated adhesive layer 32 can be formed of an ionomer that softens as it is heated to adhere Go a surface. Such an ionomer is marketed under the registered trademark Surlyn of E. I. DuPont DeNemours & Company. Such an adhesive can be heated by conduction and or some other means to soften and adhere as desired.

The seal portion 13 is preferably formed of a metal foil, although some other substance, such as a plastic film, could be used. The seal portion 13 is preferably an aluminum sheet having a thickness of about 0.0010 inches. The seal portion 13 separates from the container 10 or tears when a user pulls on the pull-tab 16 to open the container 10. The seal portion 13 readily indicates tampering because tears therein are irreparable. However, the seal portion 13 is durable enough to withstand contact incidental to handling and shipping. Furthermore, the seal portion 13 is impermeable by liquid and vapor. Thus, the seal portion 13 effectively seals out moisture and germs from the container 10.

Alternatively, the adhesive layer 32 can be weaker than the seal portion 13, so that the entire seal portion 13 separates without tearing from the container 10 when the seal 1 is removed by a user.

The pull-tab portion 12 is preferably constructed of a plastic material which is suitable for extrusion. However, the plastic used should have a high enough melting temperature so that heat dissipated by the seal portion 13 from the heat activation of the adhesive layer 32 during a sealing operation does not melt or deform the pull-tab portion 12. By way of example only, one such plastic material is polyethylene.

Also, because the pull-tab 16 is used to pull the seal 1 away from the opening 18 of the container, the plastic material used to form the pull-tab portion 12 should be strong enough to withstand the pulling forces on the pull-tab 16 exerted by the user.

As illustrated in FIG. 2, the closure seal 1 is preferably shaped as a disc. Most container openings are circular. Thus, the closure seal 1 can be made to conform to the shapes of the openings of most containers. The closure seal 1 could, however, be another shape that conforms to the shape of a container opening.

In the illustrated embodiment, the first layer 22 and second layer 24 are fused together along about half of the area of the closure seal 1. The fused area between the first layer 22 and the second layer 24 could be greater or less, so long as the pull-tab 16 can exert sufficient leverage to remove the closure seal 1 from the container 10.

In FIG. 4, a process for forming the closure seal 1 is illustrated. In this process, a sheet 34 having the backing layer 28 backed with the first layer 22 is carried by a first roller 36. A group of second rollers 38 carries strips of the release layer 26. At least one roller 38 with the release layer 26 material must be provided, however multiple rollers 38, as shown, are desirable. In the embodiment illustrated in FIG. 4, five rollers 38 are provided which carry release layers 26. The multiple release layers 26 are separated from one another by a distance about equal to the width of the release layers 26. The release layers 26 roll under a third roller 40, which positions the release layers 26 onto the top of the first layer 22 in spaced apart relationship.

An extruder 42 is provided which extrude a sheet-shaped molten flow of extruded plastic 44 of the material used to form the second layer 24 which when fused with the first layer 22 forms the unitary pull-tab portion 12. This extruded plastic 44 partially cools as it leaves the extruder 42.

A fourth roller 46 carries a sheet of material such as foil, or sheets of material, to form the seal portion 13. The seal portion 13 and the extruded plastic 44 are both fed under a fifth 15 roller 48. The fifth roller 48 positions the extruded plastic 48 onto the top of the first layer 22 and the release layer 26 where the extruded plastic 44 forms the second layer 24.

The fifth roller 48 and a sixth roller 50 press the layers together. At this point, the second layer 24 is warm and partially melted. Thus, the second layer 24 fuses with the first layer 22 between the strips of release material 26. Also, the foil 30 bonds to the second layer 24. Of course, the seal portion 13 can be secured to the second layer 24 by means of a suitable adhesive, such as those mentioned in the above-identified patents.

Leaving the fifth 48 and sixth rollers 50 is a composite sheet 52 formed having several layers: the backing layer 28 backed with the first layer 22; the positioned strips of the release layer 26; the extruded second layer 24; and the seal portion 13. The seal portion 13 can include a backing of the adhesive layer 32, in which case the composite sheet 52 would also include the adhesive layer 32. Optionally, heat can be provided by the fifth roller 48, the sixth roller 50 or by both that the composite sheet securely bonds together.

The composite sheet 52 is preferably collected on a seventh roller 54 for storage. The composite sheet 52 can be collected on the sevon the seventh roller 54 without the adhesive layer 32 where the adhesive layer 32 is to be applied at some later time.

The composite sheet 52 is passed through a cutting device (not shown) that cuts or stamps out the closure seals 1. In the embodiment illustrated in FIG. 5, multiple disc-shaped closure seals 1 can be cut from the composite sheet 52. The cutting process is such that each disc overlaps one of the release layers 26 by the desired amount. In the embodiment shown, about one-half each disc-shaped closure seal 1 overlaps one of the release layers 26.

A closure seal 1 can then be sealably adhered around a container opening 18 by heating the adhesive layer 32 and positioning the closure seal 1.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A seal for a container comprising:
a seal portion having an upper surface and a lower surface, the lower surface being securable around an opening of the container; and
a unitary-pull tab portion secured across the entirety of said upper surface, the pull-tab portion having a partial separation formed therein to form a pull-tab in the pull-tab portion, a remainder of the unitary pull-tab portion being non-separated such that said unitary pull-tab portion can be completely removed as a unit by operative grasping and pulling of said pull-tab.

2. The seal of claim 1 further comprising a layer of polyester film bonded to the pull-tab portion over the pull-tab.

3. A seal for a container comprising:
a seal portion having an upper surface and a lower surface, the lower surface being securable around an opening of the container; and
a unitary-pull tab portion secured across the entirety of said upper surface, the pull-tab portion having a partial separation formed therein to form a pull-tab in the pull-tab portion,
wherein the seal portion is a layer of aluminum foil.

4. A seal for a container comprising:
a seal portion having an upper surface and a lower surface, the lower surface being securable around an opening of the container;
a unitary-pull tab portion secured across the entirety of said upper surface, the pull-tab portion having a partial separation formed therein to form a pull-tab in the pull-tab portion; and
a layer of release material positioned within the separation and which separates the pull-tab from a remainder of the pull-tab portion.

5. A seal for a container comprising:
a seal portion having an upper surface and a lower surface, the lower surface being securable around an opening of the container; and
a unitary-pull tab portion secured across the entirety of said upper surface, the pull-tab portion having a partial separation formed therein to form a pull-tab in the pull-tab portion,
wherein the pull-tab portion is formed of a first layer of a plastic material and a second layer of the plastic material which are fused together such that a separated portion of the first layer forms the pull-tab and fused portions of the first and second layers and an unfused portion of the second layer form a remainder of the pull-tab portion.

6. A seal for a container comprising:
a seal portion having an upper surface and a lower surface, the lower surface being securable around an opening of the container; and
a unitary-pull tab portion secured across the entirety of said upper surface, the pull-tab portion having a partial separation formed therein to form a pull-tab in the pull-tab portion,
wherein the pull-tab portion is formed of a first layer of a plastic material and a second layer of the plastic material which are fused together such that a separated portion of the first layer forms the pull-tab and fused portions of the first and second layers and an unfused portion of the second layer form a remainder of the pull-tab portion, and
wherein one of the first and second layers is extruded onto the other of the first and second layers.

7. A seal for a container comprising:
a layer of polyester film;
a first layer of plastic material secured to an entire upper surface of the layer of polyester film, the first layer also having an upper surface;
a sheet of release material partially covering the upper surface of the first layer;
a second layer of the plastic material, the second layer being fused to the uncovered portion of the upper surface of the first layer so that said first layer and said second layers form a unitary member; and
a seal layer secured to the second layer;

wherein a portion of the first layer adjacent to the release material forms a pull-tab.

8. The seal of claim 7 wherein the seal layer is a foil layer secured to the second layer and the foil layer is securable around an opening of the container.

9. The seal of claim 8 further comprising an adhesive layer against the foil layer for adhering the foil layer around an opening of the container.

10. The seal of claim 9 wherein the adhesive layer is heat activatable.

11. A tamper indicating seal according to claim 7 wherein the pull-tab comprises approximately one half of the first layer.

* * * * *